Feb. 25, 1964     M. S. HANKE     3,122,028

ADJUSTABLE PULLEY

Filed Jan. 25, 1962

INVENTOR.
MERLIN S. HANKE
BY *Watts & Fisher*
ATTORNEYS.

United States Patent Office 3,122,028
Patented Feb. 25, 1964

3,122,028
ADJUSTABLE PULLEY
Merlin S. Hanke, 501 Vineland Road, Bay Village, Ohio
Filed Jan. 25, 1962, Ser. No. 168,623
14 Claims. (Cl. 74—230.17)

This invention relates to the pulley art and more particularly to adjustable pitch pulley construction.

In many modern applications, a V-belt which engages two or more pulleys is used to transmit power from one shaft to another. In many of these applications, it is desirable to provide a pulley which is adjustable so that the diameter of that portion of a power transmission belt which is in contact with faces of the pulley flanges can be adjusted thereby adjusting the speed ratio of a driving and a driven pulley. It is also desirable to provide for adjustment of a pulley along its shaft to permit alignment of the driving and driven pulleys.

In the past, many proposals have been made for relatively adjusting the two opposite flanges of a pulley for the purpose of varying the effective diameter of the portion of a belt in contact with the flanges. In adjustable pulleys of the class here under consideration, one flange of the pulley is moved relative to the other and is then clamped in its adjusted position. When such a diameter adjustment is effected, it often becomes necessary to adjust the pulley axially relative to the shaft in order to align the adjusted pulley with its coacting pulley. In the past, this second adjustment has usually either been ignored or has been affected by a second and separate adjustment.

With this present invention, sequential clamping of the relatively positioned pulley flanges followed by simultaneous clamping of the flanges and uniform securing of the pulley on its supporting shaft is obtained. A single lock nut is used to both clamp the adjustable flanges in an adjusted position and lock the pulley in a selected position on a shaft after a dog has been inserted in flange slots to fix the flanges against relative rotation. This dog also coacts with a flat on the shaft to assist in locking the pulley in the shaft.

A great disadvantage of most prior art pulleys has been the use of set screws either to lock the two pulley flanges in a relatively adjusted position or to lock the pulley on the shaft. The use of set screws in pulleys has several distinct disadvantages. Set screws tend to cause a cocking or tilting of a pulley and a resultant "run out." After a pulley has been used for a time on a given shaft, a number of recesses will have been formed in the shaft and it becomes extremely difficult to get a fine, close adjustment since the set screw tends to seat itself in one of the previously formed recesses. In addition, the presence of a set screw can destroy the balance of the pulley and cause an out-of-balance condition. Furthermore, set screws have a tendency to work loose when the pulley is in use thereby releasing the pulley to shaft connection and necessitating service and repair of the mechanism in which the pulley is used.

With the present invention all of these disadvantages are overcome through the elimination of the set screw and through a more positive, stronger, economical and easy to adjust construction. This construction will not work loose from the shaft and will lock one pulley flange against rotation with respect to the other pulley flange.

According, the principal object of this invention is to provide a novel and improved pulley with improved pulley with improved adjustment and locking.

More specifically a principal object of the invention is to provide a pulley with stronger and more positive locking of the pulley to a shaft and locking of one pulley flange against rotation with respect to the other pulley flange.

Another object of the invention is to eliminate tilting and cocking of a pulley structure having adjustably spaced side flanges.

A further object is to provide an adjustable pulley which is locked into its adjustment position and locked upon the shaft by a single tightening operation.

The general object of this invention, then, is to provide a superior adjustable pulley of less costly and more trouble free construction than has previously been available.

Other objects and a fuller understanding of the invention may be had by referring to the following description and claims taken in conjunction with the accompanying drawings in which:

Figure 1:
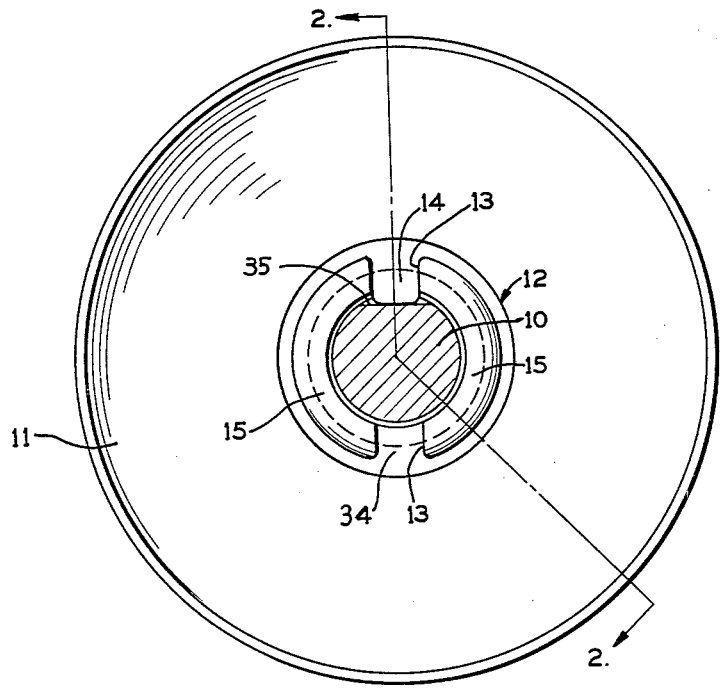
FIGURE 1 is an end elevational view of a novel and improved pulley as seen from the plane indicated by the line 1—1 of FIGURE 2.

In the drawing, the preferred embodiment of the invention is shown mounted on a shaft 10. According to this preferred construction, the pulley has a reference flange 11, carried by a hub 12. One end of the hub 12 is slotted at 13 to receive cooperating, inwardly extending lugs 14, 34 on the reference flange 11. On either side of these two slots 13, the hub is formed radially outwardly over the reference flange at 15 to provide two holding shoulders, each of which transcribes a segment of a circle. In this manner the reference flange 11 and the hub 12 are rigidly fixed together as a unitary flange structure.

Figure 2:
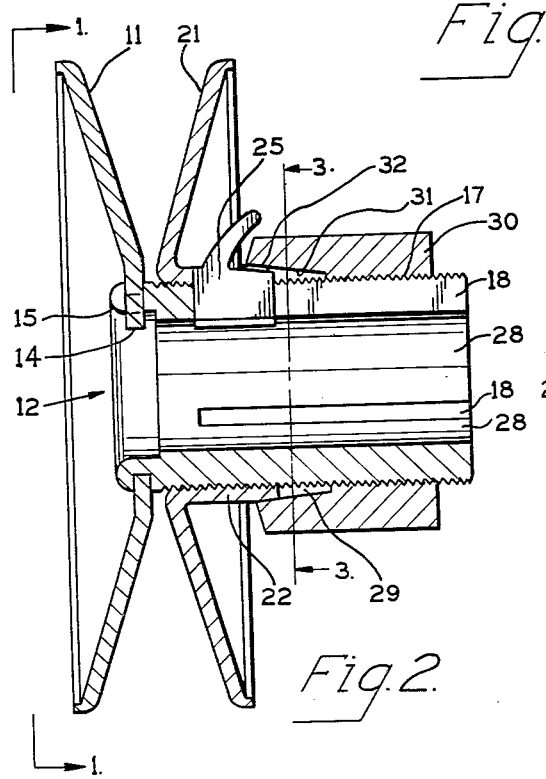
FIGURE 2 is a sectional view of the device as seen from the planes indicated by the line 2—2 of FIGURE 1; and, FIGURE 3 is a fragmentary sectional view of the pulley as seen from the plane indicated by the line 3—3 of FIGURE 2.
Figure 3:
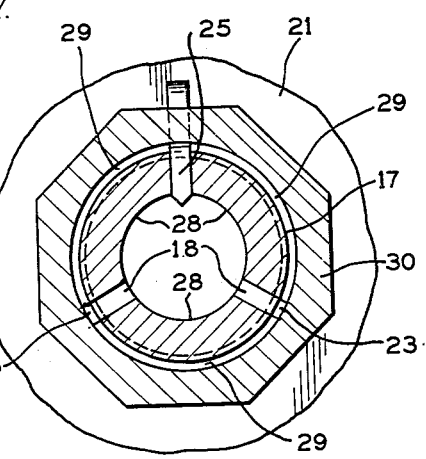

The hub 12 is peripherally threaded to the right of the reference flange 11, as seen in FIGURE 2. This threaded portion of the hub is designated by the numeral 17. The threaded portion 17 has elongated slots 18 terminating short of the base flange 11. The purpose of these slots 18 will be described in greater detail below.

The preferred construction of the pulley further includes an adjustable flange 21. The adjustable flange 21 includes an annular collar portion 22 which is threaded to cooperate with the hub portion 17. By reason of this construction, the adjustable flange 31 is threadably adjustable along the threaded portion 17 of the hub 12 to an appropriate and selected distance from the reference 11. The adjustable collar portion 22 also has circumferential slots 23 which correspond to the slots 18 in the hub 17. When the flange 21 has been threadably adjusted to the desired position relative to the reference flange 11, one of the slots 23 is brought into alignment with a slot 18. A dog or key 25 may then be inserted in the aligned slots to maintain the relative spacing of the pulley flanges 11 and 21 until they are locked in position.

As will be apparent from the foregoing description, the slots 18 in the threaded hub 17 divide this hub into a plurality of radially flexible fingers 28. Similarly, the slots 23 in the collar portion 22 divide this portion into a corresponding plurality of radially flexible fingers 29. A lock sleeve 30 is threaded onto the hub 17. The lock sleeve 30 includes an internal camming surface 31 (FIG. 2) which overlies the end portion of the compressible fingers 29 of the collar portion 22. The camming surface 31 is preferably complemental with external camming surfaces 32 on the fingers 29.

When the adjustable flange 21 has been appropriately positioned relative to the reference flange 11 in the manner described and has been temporarily locked by the dog 25, the lock sleeve 30 is rotated to advance it toward the flange 21. As the sleeve advances the camming surface 31 coacts with the complemental camming surfaces 32 of the fingers 29 to simultaneously cam the flange fingers 29 against the hub fingers 28 and to cam the dog 25 against a flat 35 on the shaft to inhibit rotation of the pulley on the shaft. An examination of FIGURE 1 will show that the flange lug 34 extends through the associated one of the hub slots 13 to coact with the flat 35. The pulley is then located axially on the shaft and the lock sleeve is further advanced to further cam the flange fingers inwardly and to cam the hub fingers 28 toward and against the shaft 10. This simultaneous, radial camming action of the fingers 28 and 29 effectively locks the pulley on the shaft 10 while fixing the flanges 11 and 21 in their adjusted, relatively spaced position. A particular advantage of the compound, simultaneous locking action that is obtained with the invention is that the radial locking pressure is uniformly distributed around the shaft 10 with greatly increased pressure. Thus, the invention prevents cocking or tilting of the pulley flanges on the shaft and assures proper balance of the pulley in operation.

With this described construction it is possible to relatively position the flanges 11, 21, then insert the dog 25 and then tighten the lock sleeve enough to clamp the flanges together without distending the hub fingers 28 inwardly. Thereafter the pulley may be moved axially on the shaft to a desired position and finally the lock sleeve is fully tightened to simultaneously effect the conclusion of the locking of the flange in an adjusted position and the locking of the pulley on the shaft.

While the invention has been described with a great deal of detail, it is believed that it essentially comprises an adjustable pulley. Each pulley includes an integral hub and a relatively adjustable flange. The relatively adjustable flange and hub portions are cooperatively slotted to permit a temporary locking action. Each pulley includes additional structure for simultaneously locking it in an adjusted position and securing it to a supporting shaft under radially uniform locking pressure and a coacting dog is provided to fix the flanges against relative rotation, and to assist in locking the pulley to the shaft.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An adjustable pulley comprising, first and second pulley flange structures, each structure including an outwardly extending flange portion, one of said structures including a hub portion and the other a collar portion, the hub and collar portions being in telescopic relationship, an end of each of said hub and collar portions remote from its flange portion being inwardly flexible, and clamp means acting upon said hub and collar portions to clamp the hub and collar portions and simultaneously reduce the inside diameter of at least a section of the hub and collar portions.

2. An adjustable pulley comprising, first and second pulley flange structures, each structure including an outwardly extending flange portion, one of the structures including a hub portion and the other including a collar portion, the hub and collar portions being in telescopic relationship, an end of each of said hub and collar portions remote from its flange portion being inwardly flexible, and a camming nut having threaded engagement with an outer surface of one of said hub and collar portions and having a forward camming surface engaged with the other of said hub and collar portions to clamp the hub and collar portions and simultaneously reduce the inside diameter of at least a section of the hub and collar portions.

3. A pulley wheel comprising first and second oppositely tapered annular flange structures oriented to provide an inwardly tapering annular slot for receipt of a drivingly engaged V-belt or the like, the first structure including an annular, elongated hub portion extending through the second structure, said second structure including a collar portion surrounding and in position locating engagement with the hub portion, said collar and hub portions each including at least one inwardly distensible finger, and camming means connected to at least one of said portions and in compressing engagement with each such finger.

4. The device of claim 3 wherein the camming means is a nut threaded onto the hub portion and in compressing engagement with each such collar finger.

5. A pulley comprising a tubular hub having first and second ends, an annular reference flange fixed to the hub near the first end, said reference flange having an internal protrusion which extends inwardly through the hub for snug engagement with the flat of a shaft, said reference flange flaring outwardly away from said second end, said hub having external threads extending from the second end toward the first, a second annular flange including an internally threaded tubular collar portion threaded on the hub, said collar portion extending from a first end nearest said reference flange to a second end remote from the reference flange, said second flange being tapered outwardly and oriented in a direction opposite that of the reference flange whereby the flanges together define a tapered belt-receiving slot, said hub having a plurality of elongated slots extending longitudinally from its second end toward its first end to define a plurality of hub fingers, said collar portion having a plurality of elongated slots extending from its second end toward its first end to define a plurality of collar portion fingers, a camming nut threaded onto the hub and having a camming surface overlying the fingers of the collar portion, and the collar portion fingers having camming surfaces coactable with the nut camming surface whereby all of the fingers are compressed when the nut is threaded along the hub and against the camming surfaces.

6. The device of claim 5 wherein at least one such hub slot and at least one such collar portion slots are aligned and a dog is disposed in two such aligned slots to maintain such alignment.

7. A pulley comprising a tubular hub having first and second ends and a peripheral flange-receiving groove adjacent the first end, an annular reference flange in said groove and fixed to the hub, said reference flange flaring outwardly away from said second end, said hub having external threads extending from the second end toward the first, a second annular flange including an internally threaded tubular collar portion threaded on the hub, said collar portion extending from a first end nearest said reference flange to a second end remote from the reference flange, said second flange being tapered outwardly and oriented in a direction opposite that of the reference flange whereby the flanges together define a tapered belt-receiving slot, said hub having a plurality of elongated slots extending longitudinally from its second end toward its first end to define a plurality of hub fingers, said collar portion having a plurality of elongated slots extending from its second end toward its first end to define a plurality of collar portion fingers, a camming nut threaded onto the hub and having a camming surface overlying the fingers of the collar portion, and the collar portion fingers having camming surfaces coactable with the nut camming surface whereby all of the fingers are compressed when the nut is threaded along the hub and against the finger camming surfaces.

8. The device of claim 3 wherein said portions including aligned slots between two such fingers and a dog disposed in the aligned slots.

9. The device of claim 3 wherein the hub portion includes a through bore and wherein the first structure includes an inwardly extending projection extending into the hub portion bore for coaction with a flat on a pulley supporting shaft.

10. The device of claim 3 wherein said hub portion has an elongated slot in alignment with a slot in the collar portion and a dog is disposed in the aligned slots and projectable into the interior of the hub portion.

11. The device of claim 10 wherein the dog projects into the interior of the hub portion and the camming means acts against the dog to drive it against a flat on a pulley supporting shaft.

12. A pulley wheel comprising, first and second oppositely tapered annular flange structures oriented to provide an inwardly tapering annular slot for receipt of a drivingly engaged V-belt or the like, the first structure including an annular, elongated hub portion extending through the second structure, said second structure including a collar portion surrounding and in position locating engagement with the hub portion, said collar and hub portions each including at least one inwardly distensible finger, camming means connected to at least one of said portions and in compressing engagement with each such finger, said hub portion including a through-bore, and said first structure including an inwardly extending projection extending into the hub portion bore for coaction with a flat on a pulley-supporting shaft.

13. In combination with a shaft having a longitudinally disposed dog coacting surface thereon, a pulley structure comprising;
(a) first and second flange structures in face to face relationship to define a peripheral means for engaging a flexible power transmission member;
(b) one of said flange structures including a tubular hub portion telescoped over the shaft;
(c) the other of the flange structures including a tubular collar portion telescoped over the hub portion;
(d) said portions including aligned slots;
(e) a dog disposed in said aligned slots and abutable with the walls thereof; and,
(f) said dog being in abutment with said shaft surface whereby to prevent relative rotation of said flange structures and to prevent rotation of said flange structures relative to said shaft.

14. In combination with a shaft having a longitudinally disposed flat thereon, a pulley assembly comprising;
(a) first and second flange structures in face to face relationship to define a peripheral means for engaging a flexible power transmission member;
(b) said structures including means securing the two together in predetermined relationship;
(c) said structures including a hub having walls surrounding the shaft and defining a circular bore; and,
(d) one of said structures including a projection extending into the contour generated by said walls and abutable against the shaft flat to permit axial movement of the assembly relative to the shaft while limiting relative rotation.

References Cited in the file of this patent

UNITED STATES PATENTS

| | | |
|---|---|---|
| 1,372,525 | McCabe | Mar. 22, 1921 |
| 2,321,438 | Tyler | June 8, 1943 |
| 2,577,516 | Firth | Dec. 4, 1951 |
| 2,870,641 | Bellmann et al. | Jan. 27, 1959 |

FOREIGN PATENTS

| | | |
|---|---|---|
| 435,375 | France | Feb. 12, 1912 |